United States Patent
Asano

(10) Patent No.: US 11,193,270 B2
(45) Date of Patent: Dec. 7, 2021

(54) MULTILAYER NONCOMBUSTIBLE WOOD

(71) Applicant: MORIWATAKARA CO., LTD., Sakai (JP)

(72) Inventor: Nariaki Asano, Tokyo (JP)

(73) Assignee: MORIWATAKARA CO., LTD., Sakai (JP)

( * ) Notice: Subject to any disclaimer, the term of this patent is extended or adjusted under 35 U.S.C. 154(b) by 0 days.

(21) Appl. No.: 16/755,689

(22) PCT Filed: Oct. 12, 2018

(86) PCT No.: PCT/JP2018/038222
§ 371 (c)(1),
(2) Date: May 15, 2020

(87) PCT Pub. No.: WO2019/074126
PCT Pub. Date: Apr. 18, 2019

(65) Prior Publication Data
US 2021/0032859 A1 Feb. 4, 2021

(30) Foreign Application Priority Data

Oct. 13, 2017 (JP) .............................. JP2017-199940

(51) Int. Cl.
*E04B 1/94* (2006.01)
*B32B 21/13* (2006.01)
(Continued)

(52) U.S. Cl.
CPC .............. *E04B 1/944* (2013.01); *B32B 21/13* (2013.01); *E04C 3/14* (2013.01); *E04C 3/36* (2013.01); *B32B 2307/3065* (2013.01)

(58) Field of Classification Search
CPC . E04B 1/944; E04B 1/94; E04B 1/941; E04B 1/943; B27K 2240/30; B32B 2307/3065
See application file for complete search history.

(56) References Cited

U.S. PATENT DOCUMENTS 3,570,208 A * 3/1971 Nika ...................... E04B 1/944
52/746.1
5,625,996 A * 5/1997 Bechtel ................... E04B 1/943
52/834
(Continued)

FOREIGN PATENT DOCUMENTS

JP 2005-36456 A 2/2005
JP 4065416 B2 3/2008
(Continued)

OTHER PUBLICATIONS

International Search Report of PCT/JP2018/038222 dated Nov. 20, 2018 and English translation thereof.

*Primary Examiner* — Gisele D Ford
(74) *Attorney, Agent, or Firm* — Muncy, Geissler, Olds & Lowe, P.C.

(57) ABSTRACT

A multi-layered inflammable wood material A for use as a building material includes a support wood material part 1 for supporting load, an inner inflammable wood material part 2a attached to a periphery of the support wood material part 1, and an outer inflammable wood material part 2b attached to a periphery of the inner inflammable wood material part 2a, wherein the inner inflammable wood material part 2a and the outer inflammable wood material part 2b both contain therein an inflammable agent, and an amount of the inflammable agent contained in the inner inflammable wood material part 2a is smaller than an amount of the inflammable agent contained in the outer inflammable wood material part 2b.

9 Claims, 7 Drawing Sheets

(51) Int. Cl.
*E04C 3/14* (2006.01)
*E04C 3/36* (2006.01)

(56) References Cited

U.S. PATENT DOCUMENTS

| | | | | |
|---|---|---|---|---|
| 6,074,714 | A * | 6/2000 | Gottfried | B32B 1/08 |
| | | | | 428/34.6 |
| 6,393,786 | B1 * | 5/2002 | Hudson | E04B 1/941 |
| | | | | 52/171.3 |
| 10,290,004 | B1 * | 5/2019 | Conboy | G06Q 30/08 |
| 2006/0090414 | A1 * | 5/2006 | Ye | E04B 1/942 |
| | | | | 52/578 |
| 2007/0227085 | A1 * | 10/2007 | Mader | E04B 1/26 |
| | | | | 52/233 |
| 2007/0266654 | A1 * | 11/2007 | Noale | C04B 41/009 |
| | | | | 52/232 |
| 2013/0000239 | A1 * | 1/2013 | Winterowd | E04B 1/944 |
| | | | | 52/515 |
| 2014/0295164 | A1 * | 10/2014 | Parker | C09D 5/185 |
| | | | | 428/221 |
| 2015/0020476 | A1 * | 1/2015 | Winterowd | C09D 5/185 |
| | | | | 52/837 |
| 2016/0243789 | A1 * | 8/2016 | Baroux | B32B 29/002 |
| 2017/0081844 | A1 * | 3/2017 | Dimakis | E04B 1/944 |
| 2017/0321418 | A1 * | 11/2017 | Tremblay | E04C 3/122 |
| 2019/0047263 | A1 * | 2/2019 | Braun | B32B 21/14 |
| 2020/0147828 | A1 * | 5/2020 | Sun | B27D 1/04 |
| 2021/0001604 | A1 * | 1/2021 | Stewart | B32B 13/12 |
| 2021/0040730 | A1 * | 2/2021 | Asano | E04B 1/94 |

FOREIGN PATENT DOCUMENTS

| | | | |
|---|---|---|---|
| JP | 4292119 | B2 | 7/2009 |
| JP | 2016-30896 | A | 3/2016 |

* cited by examiner

MULTILAYER NONCOMBUSTIBLE WOOD

TECHNICAL FIELD

The present invention relates to multi-layered inflammable wood materials and, in more detail, to a multi-layered reinforced wood material for use as a building material.

BACKGROUND ART

Many wooden buildings using wood materials for a main portion in view of structural resistance have been constructed.

Wooden buildings have humidity control properties, heat insulating properties, and so forth, and play a role of reducing environmental load because the wood materials themselves are recyclable.

However, wood materials have properties of being flammable and less resistant to fire.

Also, while wood materials are excellent in processability, they also have a drawback of poor strength.

Thus, in recent years, as building materials for use in wooden buildings, those having fire resistance and excellent in strength have been desired.

Note that, for example, known as a building material with fire resistance is a structure material including a load support layer formed of a wood material or the like sufficient to support long-term loading, a burning stop layer arranged outside the load support layer and having a high-heat-capacity material with a heat capacity larger than that of the wood material, and a burning margin layer arranged outside the burning stop layer and made of a wood material having a predetermined burning margin thickness (for example, refer to PTLs 1 to 3).

Since this structure material includes the burning margin layer as a portion to be lost at the time of a fire, the load support layer maintains strength over a predetermined period of time even if the burning margin layer is burning, thereby allowing the building to be prevented from collapsing.

CITATION LIST

Patent Literature

PTL 1: Japanese Patent Application Laid-Open No. 2005-36456
PTL 2: Japanese Patent No. 4065416
PTL 3: Japanese Patent No. 4292119

SUMMARY OF INVENTION

Technical Problem

However, in the structure materials described in the above-described PTLs 1 to 3, the structure is such that while fire resistance is provided, the burning margin layer burns. Therefore, at the time of burning of the burning margin layer, that fire may be transferred to another object.

Also, with the burning margin layer burning, heat is transmitted also to the load support layer (support wood material part). Thus, there is a high possibility that damages remain also in the load support layer.

The present invention was made in view of the above-described circumstances, and has an object of providing a multi-layered inflammable wood material in which fire resistance is excellent and damages on the support wood material part are extremely small even if a fire occurs nearby.

Solution to Problems

As diligently conducting studies to solve the above-described problem, the inventor has found that the above-described problem can be solved by providing an inner inflammable wood material part having a small content of an inflammable agent and an outer inflammable wood material part having a large content of the inflammable agent outside the support wood material part, leading to completion of the present invention.

The present invention resides in (1) a multi-layered inflammable wood material for use as a building material, including a support wood material part for supporting load, an inner inflammable wood material part attached to a periphery of the support wood material part, and an outer inflammable wood material part attached to a periphery of the inner inflammable wood material part, wherein the inner inflammable wood material part and the outer inflammable wood material part both contain therein an inflammable agent, and an amount of the inflammable agent contained in the inner inflammable wood material part is smaller than an amount of the inflammable agent contained in the outer inflammable wood material part.

The present invention resides in (2) the multi-layered inflammable wood material described in the above-described (1), in which a content of the inflammable agent in the inner inflammable wood material part is equal to or larger than 50 kg/m$^3$ and smaller than 200 kg/m$^3$, and a content of the inflammable agent in the outer inflammable wood material part is equal to or larger than 200 kg/m$^3$.

The present invention resides in (3) the multi-layered inflammable wood material described in the above-described (1) or (2), in which the inner inflammable wood material part and the outer inflammable wood material part are both formed by mutually coupling a plurality of laminated block materials containing therein the inflammable agent.

The present invention resides in (4) the multi-layered inflammable wood material described in the above-described (3), in which the laminated block materials each have a convex part or a concave part, and the convex part of one said laminated block material fits in the concave part of another said laminated block material.

The present invention resides in (5) the multi-layered inflammable wood material described in the above-described (3) or (4), in which the laminated block materials are each formed by mutually laminating a plurality of plate-shaped wood materials.

The present invention resides in (6) the multi-layered inflammable wood material described in any one of the above-described (1) to (5), in which the inflammable agent is a boron-based inflammable agent.

The present invention resides in (7) the multi-layered inflammable wood material described in any one of the above-described (1) to (6), in which a sheet part made of a carbon fiber reinforced plastic is further provided between the support wood material part and the inner inflammable wood material part.

The present invention resides in (8) the multi-layered inflammable wood material described in the above-described (7), in which the support wood material part has a shape of a polygonal prism, the sheet part has a long shape, and the sheet part is laminated to each side surface of the support wood material part along a longitudinal direction of the side surface.

The present invention resides in (9) the multi-layered inflammable wood material described in any one of the above-described (1) to (8) for use as a pillar or beam.

Advantageous Effects of Invention

The multi-layered inflammable wood material of the present invention includes the support wood material part for supporting load. Thus, structural resistance can be reliably maintained.

Also, the support wood material part is covered with the inner inflammable wood material part and the outer inflammable wood material part, and thus does not receive external influences and can maintain its initial state.

In the multi-layered inflammable wood material of the present invention, the inner inflammable wood material part is attached to the periphery of the support wood material part and the outer inflammable wood material part is attached to its periphery, thereby allowing the multi-layered inflammable wood material itself to be prevented from burning (hereinafter also referred to as a "burning prevention effect"). That is, at the time of a fire or the like, while the multi-layered inflammable wood material is heated from outside, the outer inflammable wood material part having an sufficient amount of the inflammable agent is attached to the outermost side of the multi-layered inflammable wood material and thus the burning prevention effect can be sufficiently exerted. This does not cause a situation in which a fire is transferred from the multi-layered inflammable wood material to another object.

Note that burning due to heat transfer from outside the multi-layered inflammable wood material can be sufficiently prevented even by the inner inflammable wood material part having a small amount of the inflammable agent.

In the multi-layered inflammable wood material of the present invention, since the amount of the inflammable agent contained in the inner inflammable wood material part is smaller than the amount of the inflammable agent contained in the outer inflammable wood material part, heat transfer can be more suppressed (hereinafter also referred to as a "heat transfer suppression effect"). This allows the support wood material part to be sufficiently prevented from receiving damages by transferred heat.

Therefore, with the multi-layered inflammable wood material including the inner inflammable wood material part and the outer inflammable wood material part, by exerting both of the burning prevention effect and the heat transfer suppression effect, fire resistance is excellent, and damages on the support wood material part can be made extremely small even if a fire occurs nearby.

Here, a content of the inflammable agent in the inner inflammable wood material part is preferably equal to or larger than 50 kg/m$^3$ and smaller than 200 kg/m$^3$, and a content of the inflammable agent in the outer inflammable wood material part is preferably equal to or larger than 200 kg/m$^3$. In these cases, the multi-layered inflammable wood material can effectively exert the burning prevention effect and the heat transfer suppression effect.

In the multi-layered inflammable wood material of the present invention, when the inner inflammable wood material part and the outer inflammable wood material part are both formed by mutually coupling the plurality of laminated block materials containing therein the inflammable agent, attachment of the inner inflammable wood material part to the support wood material part via the sheet part and attachment of the outer inflammable wood material part to the inner inflammable wood material part can be easily made.

In the multi-layered inflammable wood material of the present invention, in a mode in which the laminated block materials each have a convex part or a concave part at an end part and the convex part of one laminated block material fits in the concave part of another laminated block material, the laminated block materials can be firmly coupled.

In the multi-layered inflammable wood material of the present invention, when the laminated block materials are each formed by mutually laminating the plurality of plate-shaped wood materials, by adjusting the number of plate-shaped wood materials to be laminated, the thickness of the laminated block material can be freely adjusted.

Also, by laminating the plate-shaped wood materials as being shifted from one another, the convex part and concave part described above can be easily formed.

In the multi-layered inflammable wood material of the present invention, the sheet part made of a carbon fiber reinforced plastic is further provided between the support wood material part and the inner inflammable wood material part, thereby allowing an improvement in strength.

In particular, the above-described fiber reinforced plastic has a long shape and is laminated to each side surface of the support wood material part in the longitudinal direction, thereby allowing an improvement in strength of the multi-layered inflammable wood material in the longitudinal direction. That is, the fiber reinforced plastic is excellent in strength and does not have stretching properties, and thus can suppress breaking and bending of the multi-layered inflammable wood material by an earthquake or the like.

Also, in the multi-layered inflammable wood material, even if heat is accumulated in the inner inflammable wood material part, heat transfer to the support wood material part is interrupted by the sheet part, and thus it is possible to more suppress damages on the support wood material part.

The multi-layered inflammable wood material of the present invention can be suitably used as a pillar or beam among building materials.

DESCRIPTION OF EMBODIMENTS

Figure 1A:
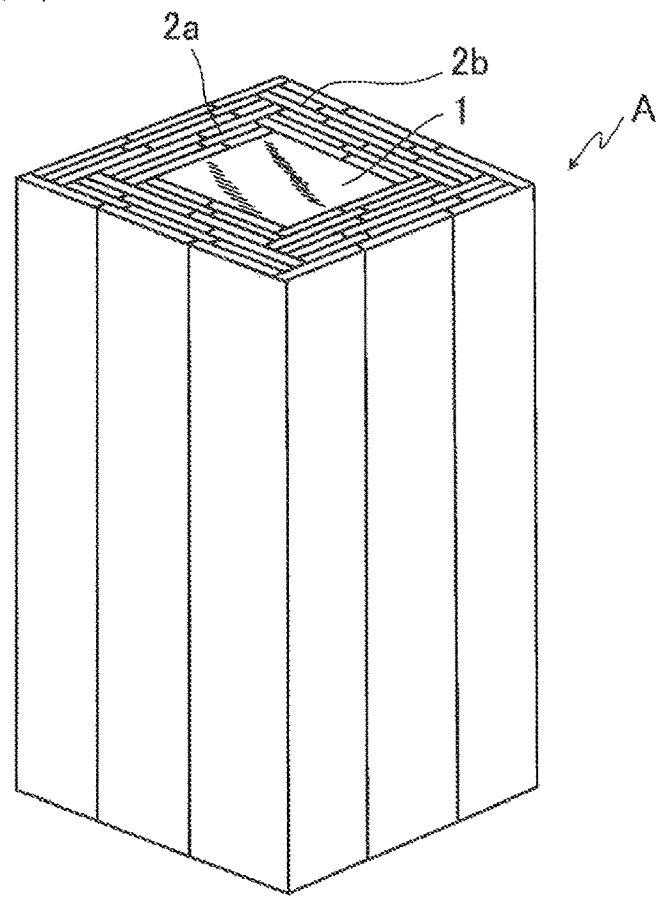
FIG. 1(a) is a perspective view depicting a first embodiment in which the multi-layered inflammable wood material according to the present invention is used as a pillar.

In the following, with reference to the drawings as required, suitable embodiments of the present invention are described in detail. Note in the drawings that the same components are provided with the same reference character and redundant description is omitted. Also, positional relations such as above, below, left, and right are based on the positional relations depicted in the drawings unless otherwise specified. Furthermore, the dimensional ratio in the drawings is not limited to the ratio in the drawings.

The multi-layered inflammable wood material according to the present invention has a shape of a rectangular parallelepiped, and is used as a building material. Specifically, it is suitably used as a pillar or beam.

First Embodiment

First, a first embodiment of the multi-layered inflammable wood material according to the present invention is described.

A multi-layered inflammable wood material A according to the first embodiment is an example when used as a pillar.

Figure 1B:
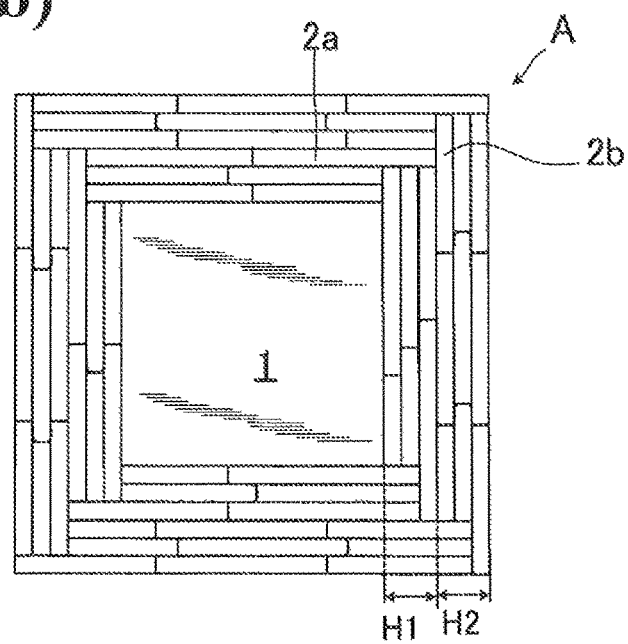
FIG. 1(b) is a horizontal sectional view thereof.

FIG. 1(a) is a perspective view depicting the first embodiment in which the multi-layered inflammable wood material according to the present invention is used as a pillar, and FIG. 1(b) is a horizontal sectional view thereof.

As depicted in FIG. 1(a) and FIG. 1(b), the multi-layered inflammable wood material A includes a support wood material part 1, which is a wood material for supporting load, an inner inflammable wood material part 2a attached to the periphery of the support wood material part 1, and an outer inflammable wood material part 2b attached to the periphery of the inner inflammable wood material part 2a. That is, in the multi-layered inflammable wood material A, the periphery of the support wood material part 1 is covered with the inner inflammable wood material part 2a and the outer inflammable wood material part 2b.

Note that while the inner inflammable wood material part 2a and the outer inflammable wood material part 2b are not provided to the upper surface and the lower surface of the multi-layered inflammable wood material A, the upper surface and the lower surface are bonded to other building materials such as beams, pillars, or floors (slabs) when the multi-layered inflammable wood material A is used as a pillar, and therefore, as a result, the upper surface and the lower surface of the multi-layered inflammable wood material A are not exposed.

Here, the "support wood material part" means a portion made of a wood material to support load.

Also, the "inner inflammable wood material part" means a portion positioned inside and made of a wood material containing therein an inflammable agent, and the "outer inflammable wood material part" means a portion positioned outside and made of a wood material containing therein an inflammable agent. Note that the inner inflammable wood material part 2a and the outer inflammable wood material part 2b are made inflammable by the action of the inflammable agent.

In the multi-layered inflammable wood material A, the inner inflammable wood material part 2a is attached to the periphery of the support wood material part 1, and the outer inflammable wood material part 2b is attached to its periphery. Thus, it is possible to prevent the multi-layered inflammable wood material A itself from burning even if a fire occurs nearby. This does not cause a situation in which a fire is transferred from the multi-layered inflammable wood material A to another object Also, as described above, the amount of the inflammable agent contained in the inner inflammable wood material part 2a is smaller than the amount of the inflammable agent contained in the outer inflammable wood material part 2b. Thus, heat transfer can be more suppressed. This can sufficiently prevent damages on the support wood material part by transferred heat.

Furthermore, in the multi-layered inflammable wood material A, the support wood material part 1 is protected by the inner inflammable wood material part 2a and the outer inflammable wood material part 2b, and thus neither catches fire nor receives other external influences, and can maintain its initial state.

From these, the multi-layered inflammable wood material according to the first embodiment is excellent in fire resistance, and damages on the support wood material part can be made extremely small even if a fire occurs nearby.

In the multi-layered inflammable wood material A, the support wood material part 1 is a wood material in the shape of a quadrangular prism serving as a core for supporting load.

The support wood material part 1 is designed so as to be safe alone with respect to load in view of structural resistance. That is, since the support wood material part 1 alone can support load, the structural resistance can be reliably maintained even if the inner inflammable wood material part 2a and the outer inflammable wood material part 2b are removed.

Note that "load" means fixed load, live load, snow load, wind load, earthquake load, and load by earth pressure or hydraulic pressure defined in the Building Standards Act.

In the multi-layered inflammable wood material A, a wood material for use as the support wood material part 1 is not particularly restrictive, and general ones can be listed, such as red pine, cypress, larch, cedar, hiba, chestnut tree, hemlock, spruce, Alaska cedar, and Oregon pine.

Also, as the support wood material part 1, a so-called solid material, which is a wood material cut out from a log is adopted in view of interior humidity adjustment.

The inner inflammable wood material part 2a is attached to the periphery of the support wood material part 1.

In the multi-layered inflammable wood material A, when the inner inflammable wood material part 2a is attached to the support wood material part 1, a bonding agent may be applied, or both may be fixed with a fixture such as a screw or nail. In this case, both can be more firmly coupled. Note that when no bonding agent is used or no fixture is used, it is possible to easily attach and detach the inner inflammable wood material part 2a to and from the support wood material part 1.

The outer inflammable wood material part 2b is attached to the periphery of the inner inflammable wood material part 2a.

In the multi-layered inflammable wood material A, when the outer inflammable wood material part 2b is attached to the inner inflammable wood material part 2a, a bonding agent may be applied, or both may be fixed with a fixture such as a screw or nail. In this case, both can be more firmly coupled. Note that when no bonding agent is used or no fixture is used, it is possible to easily attach and detach the outer inflammable wood material part 2b to and from the inner inflammable wood material part 2a.

The inner inflammable wood material part 2a and the outer inflammable wood material part 2b both contain therein the inflammable agent.

And, the amount of the inflammable agent contained in the inner inflammable wood material part 2a is smaller than the amount of the inflammable agent contained in the outer inflammable wood material part 2b.

With this, by exerting both of the burning prevention effect and the heat transfer suppression effect, the multi-layered inflammable wood material A is excellent in fire resistance, and damages on the support wood material part can be made extremely small even if a fire occurs nearby.

Specifically, a content W1 of the inflammable agent in the inner inflammable wood material part 2a is preferably equal to or larger than 50 kg/m$^3$ and smaller than 200 kg/m$^3$. If the content W1 is smaller than 50 kg/m$^3$, compared with a case in which the content W1 is within the above-described range, heat transfer to the support wood material part 1 can be suppressed, but the inner inflammable wood material part 2a near the outer inflammable wood material part 2b may be damaged due to transferred heat. If the content W1 is equal to or larger than 200 kg/m$^3$, compared with the case in which the content W1 is within the above-described range, the heat transfer suppression effect is insufficient, and heat may be transferred to the support wood material part 1.

On the other hand, a content W2 of the inflammable agent in the outer inflammable wood material part 2b is preferably equal to or larger than 200 kg/m$^3$. If the content W2 is smaller than 200 kg/m$^3$, compared with a case in which the content W2 is within the above-described range, the burning prevention effect of the outer inflammable wood material part 2b directly in contact with a fire may be insufficient.

The inner inflammable wood material part 2a and the outer inflammable wood material part 2b are both formed by mutually coupling a plurality of laminated block materials.

The inner inflammable wood material part 2a (laminated block material) preferably has a thickness H1 of 5 mm to 30 mm. If the thickness H1 is smaller than 5 mm, compared with a case in which the thickness H1 is within the above-described range, heat may be transferred to the support wood material part 1 if a fire occurs nearby. If the thickness H1 exceeds 30 mm, compared with the case in which the thickness H1 is within the above-described range, heat transferability is increased, and heat may be transferred to the support wood material part.

Similarly, the outer inflammable wood material part 2b (laminated block material) preferably has a thickness H2 of 5 mm to 150 mm. If the thickness H2 is smaller than 5 mm, compared with a case in which the thickness H2 is within the above-described range, heat resistance may be insufficient. If the thickness H2 exceeds 150 mm, compared with the case in which the thickness H2 is within the above-described range, weight increases, posing drawbacks of deterioration in operability and an increase in cost.

Figure 2:
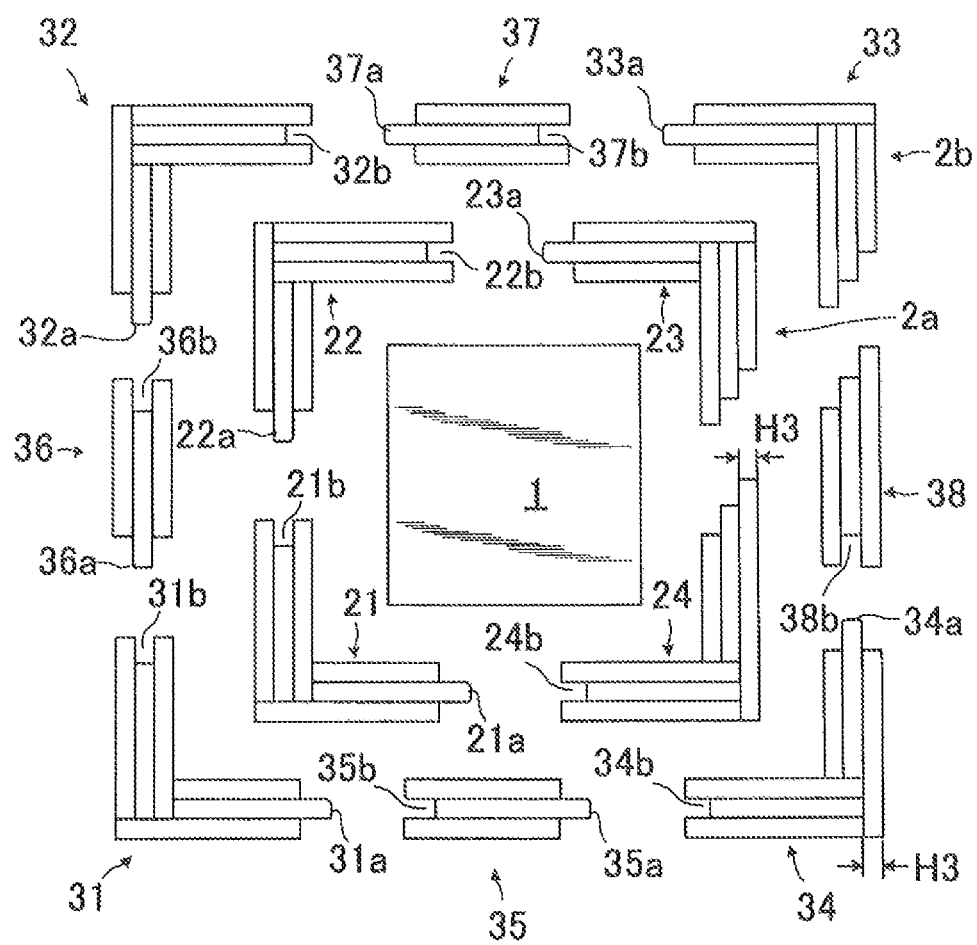
FIG. 2 is a horizontal sectional view depicting a support wood material part and a sheet part, disassembled laminated block materials of an inner inflammable wood material part, and disassembled laminated block materials of an outer inflammable wood material part in the multi-layered inflammable wood material according to the first embodiment.

FIG. 2 is a horizontal sectional view depicting a support wood material part and a sheet part, disassembled laminated block materials of the inner inflammable wood material part, and disassembled laminated block materials of the outer inflammable wood material part in the multi-layered inflammable wood material according to the first embodiment.

As depicted in FIG. 2, the inner inflammable wood material part 2a in the shape of a hollow quadrangular prism can be separated, at a portion near a substantially intermediate point of each side surface of the support wood material part 1, into four laminated block materials 21, 22, 23, and 24 each having a corner part and an L shape when viewed from top. That is, the inner inflammable wood material part 2a is formed by mutually coupling the laminated block materials 21, 22, 23, and 24. This allows easy attachment of the inner inflammable wood material part 2a to the support wood material part 1 in the multi-layered inflammable wood material A.

Note that in the following, for the purpose of convenience, in the inner inflammable wood material part 2a depicted in FIG. 2, a lower-left laminated block material is also referred to as the first inner laminated block material 21, an upper-left laminated block material is also referred to as the second inner laminated block material 22, an upper-right laminated block material is also referred to as the third inner laminated block material 23, and a lower-right laminated block material is also referred to as the fourth inner laminated block material 24.

In the inner inflammable wood material part 2a, the first inner laminated block material 21 has a convex part 21a at an end part on a fourth inner laminated block material 24 side, and has a concave part 21b at an end part on a second inner laminated block material 22 side. Also, the second inner laminated block material 22 has a convex part 22a at an end part on a first inner laminated block material 21 side, and has a concave part 22b at an end part on a third inner laminated block material 23 side. Furthermore, the third inner laminated block material 23 has a convex part 23a at an end part on a second inner laminated block material 22 side, and has an end part in the shape of steps on a fourth inner laminated block material 24 side. Still further, the fourth inner laminated block material 24 has a concave part 24b at an end part on a first inner laminated block material 21 side, and has an end part in the shape of steps on a third inner laminated block material 23 side.

And, the convex part 21a of the first inner laminated block material 21 can fit in the concave part 24b of the fourth inner laminated block material 24. Also, the convex part 22a of the second inner laminated block material 22 can fit in the concave part 21b of the first inner laminated block material 21. Furthermore, the convex part 23a of the third inner laminated block material 23 can fit in the concave part 22b of the second inner laminated block material 22. Note that the mutual fitting-in relation among these is preferably an interference fit.

Furthermore, the stepped end part of the third inner laminated block material 23 and the stepped end part of the fourth inner laminated block material 24 are oppositely oriented, and abutting makes their shapes match.

Therefore, in the multi-layered inflammable wood material A, with the stepped end part of the third inner laminated block material 23 and the stepped end part of the fourth inner laminated block material 24 facing and abutting on each other and the corresponding convex part and concave part of the laminated block materials 21, 22, 23, and 24 fitting in each other, the inner inflammable wood material part 2a is formed outside the support wood material part 1.

In this manner, in the inner inflammable wood material part 2a, the laminated block materials 21, 22, 23, and 24 are mutually coupled by using the convex parts and the concave parts. Thus, they are not detached unintentionally, and their coupling can be made firm.

Also, when the convex part fits in the concave part and when the stepped end parts abut on each other, a bonding agent may be applied, or both may be fixed with a fixture such as a screw or nail. In this case, both can be more firmly coupled. Note that when no bonding agent is used or no fixture is used, it is possible to easily attach and detach the inner inflammable wood material part 2a to the support wood material part 1.

The outer inflammable wood material part 2b in the shape of a hollow quadrangular prism can be separated, into four laminated block materials 31, 32, 33, and 34 each having a corner part and an L shape when viewed from top and linear laminated block materials (referred to as "auxiliary laminated block materials") 35, 36, 37, and 38 for coupling these laminated block materials. That is, the outer inflammable wood material part 2b is formed by mutually coupling the laminated block materials 31, 32, 33, and 34 via the corresponding auxiliary laminated block materials 35, 36, 37, and 38. This allows easy attachment of the outer inflammable wood material part 2b to the inner inflammable wood material part 2a in the multi-layered inflammable wood material A.

Note that in the following, for the purpose of convenience, in the outer inflammable wood material part 2b depicted in FIG. 2, a lower-left laminated block material is also referred to as the first outer laminated block material 31, an upper-left laminated block material is also referred to as the second outer laminated block material 32, an upper-right laminated block material is also referred to as the third outer laminated block material 33, a lower-right laminated block material is also referred to as the fourth outer laminated block material 34, a lower-side auxiliary laminated block material is also referred to as the first auxiliary laminated block material 35, a left-side auxiliary laminated block material is also referred to as the second auxiliary laminated block material 36, an upper-side auxiliary laminated block material is also referred to as the third auxiliary laminated block material 37, and a right-side auxiliary laminated block material is also referred to as the fourth auxiliary laminated block material 38.

In the outer inflammable wood material part 2a, the first outer laminated block material 31 has a convex part 31a at an end part on a first auxiliary laminated block material 35 side, and has a concave part 31b at an end part on a second auxiliary laminated block material 36 side. Also, the second outer laminated block material 32 has a convex part 32a at an end part on a second auxiliary laminated block material 36 side, and has a concave part 32b at an end part on a third auxiliary laminated block material 37 side. Furthermore, the third outer laminated block material 33 has a convex part 33a at an end part on a third auxiliary laminated block material 37 side, and has an end part in the shape of steps on a fourth auxiliary laminated block material 38 side. Still further, the fourth outer laminated block material 34 has a convex part 34a at an end part on a fourth auxiliary laminated block material 38 side, and has a concave part 34b at an end part on a first auxiliary laminated block material 35 side. Still further, the first auxiliary laminated block material 35 has a convex part 35a at an end part on a fourth outer laminated block material 34 side, and has a concave part 35b at an end part on a first outer laminated block material 31 side. Still further, the second auxiliary laminated block material 36 has a convex part 36a at an end part on a first outer laminated block material 31 side, and has a concave part 36b at an end part on a second outer laminated block material 32 side. Still further, the third auxiliary laminated block material 37 has a convex part 37a at an end part on a second outer laminated block material 32 side, and has a concave part 37b at an end part on a third outer laminated block material 33 side. Still further, the fourth auxiliary laminated block material 38 has a concave part 38b at an end part on a fourth outer laminated block material 34 side, and has an end part in the shape of steps on a third outer laminated block material 33 side.

And, the convex part 34a of the fourth outer laminated block material 34 can fit in the concave part 38b of the fourth auxiliary laminated block material 38. Also, the convex part 35a of the first auxiliary laminated block material 35 can fit in the concave part 34b of the fourth outer laminated block material 34. Furthermore, the convex part 31a of the first outer laminated block material 31 can fit in the concave part 35b of the first auxiliary laminated block material 35. Still further, the convex part 36a of the second auxiliary laminated block material 36 can fit in the concave part 31b of the first outer laminated block material 31. Still further, the convex part 32a of the second outer laminated block material 32 can fit in the concave part 36b of the second auxiliary laminated block material 36. Still further, the convex part 37a of the third auxiliary laminated block material 37 can fit in the concave part 32b of the second outer laminated block material 32. Still further, the convex part 33a of the third outer laminated block material 33 can fit in the concave part 37b of the third auxiliary laminated block material 37. Note that the mutual fitting-in relation among these is preferably an interference fit.

Furthermore, the stepped end part of the third outer laminated block material 33 and the stepped end part of the fourth auxiliary laminated block material 38 are oppositely oriented, and abutting makes their shapes match.

Therefore, in the multi-layered inflammable wood material A, with the stepped end part of the third outer laminated block material 33 and the stepped end part of the fourth auxiliary laminated block material 38 facing and abutting on each other and with the convex part and the concave part of the laminated block materials 31, 32, 33, and 34 and the corresponding convex part and concave part of the auxiliary laminated block materials 35, 36, 37, and 38 fitting in each other, the outer inflammable wood material part 2b is formed outside the inner inflammable wood material part 2a.

In this manner, in the outer inflammable wood material part 2a, the laminated block materials 31, 32, 33, 34, 35, 36, 37, and 38 are mutually coupled by using the convex parts and the concave parts. Thus, they are not detached unintentionally, and their coupling can be made firm.

Also, when the convex part fits in the concave part and when the stepped end parts abut on each other, a bonding agent may be applied, or both may be fixed with a fixture such as a screw or nail. In this case, both can be more firmly coupled. Note that when no bonding agent is used or no fixture is used, it is possible to easily attach and detach the outer inflammable wood material part 2b to and from the inner inflammable wood material part 2a.

Each of the laminated block materials (inner laminated block materials, outer laminated block materials, and auxiliary laminated block materials) contains the inflammable agent and is formed of a plurality of plate-shaped wood materials mutually laminated. This allows the inner inflammable wood material part 2a and the outer inflammable wood material part 2b to be provided with sufficient strength and be reliably made inflammable.

Here, a wood material for use as the plate-shaped wood material is not particularly restrictive, and any of general ones can be used as appropriate, such as solid materials, laminated veneer lumber (LVL), plywood, plate-shaped butcher blocks, and so forth of red pine, cypress, larch, cedar, hiba, chestnut tree, hemlock, spruce, Alaska cedar, Oregon pine, and so forth.

Also, in view of ease of handling and ease of manufacture, the plate-shaped wood material preferably has a thickness H3 of 5 mm to 50 mm.

In the multi-layered inflammable wood material A, as the inflammable agent described above, listed are as follows: a boron-based inflammable agent having a boron-based compound as a main component, such as boric acid, sodium borate, potassium borate, or ammonium borate; a phosphorus-based inflammable agent having a phosphorus-based compound as a main component, such as ammonium phosphate or guanidine phosphate; a nitrogen-based inflammable agent; a halogen-based inflammable agent having a halogen-based compound as a main component, such as ammonium bromide; a silicon-based inflammable agent having a silicon compound as a main component; and so forth.

Among these, in view of excellent safety at the time of handling, small environmental load, and sufficient acquisition of an inflammable effect, the inflammable agent is preferably a boron-based inflammable agent. Note that in the boron-based inflammable agent, the solid compound of the contained boron-based compound is preferably at least equal to or larger than 10% by mass.

A method of making the laminated block material contain the inflammable agent is not particularly restrictive. For example, listed are as follows: a spray method in which an inflammable liquid with the inflammable agent dissolved or dispersed into a medium such as water is fabricated and the inflammable liquid is sprayed to the plate-shaped wood materials before lamination or to the laminated block materials after the plate-shaped wood materials are laminated; an immersion method in which the dried plate-shaped wood materials or the dried laminated block materials are immersed into the inflammable liquid for application of the inflammable agent.

Also, when the inflammable liquid is applied to the plate-shaped wood materials or the laminated block materials or after application, a heating/cooling process or a compression/decompression process may be performed to make the inflammable liquid more uniformly penetrate.

Note that as the inflammable liquid, for example, the inflammable process liquid described in Japanese Patent No. 3485914 can also be adopted.

The plate-shaped wood materials are mutually bonded with a bonding agent.

This bonding agent is not particularly restrictive, and a known one such as a resorcinol resin bonding agent can be used as appropriate. Note that this case is not meant to be restrictive and the same goes for the described above bonding agent.

Each of the L-shaped laminated block materials 21, 22, 23, 24, 31, 32, 33, and 34 can be acquired by bonding a first laminated body, which is formed by bonding, surface to surface, plate-shaped wood materials having different lengths in a width direction so that one end of each of them aligns, to an end part of (another) plate-shaped wood material forming a corner part so as to form a right angle; bonding a second laminated body, which is formed by bonding, surface to surface, plate-shaped wood materials having different lengths in the width direction so that one end of each of them aligns, to a side surface of the first laminated body so as to form a right angle; and bonding, surface to surface, the second laminated body to the plate-shaped wood material forming the corner part. Note in the multi-layered inflammable wood material A that three plate-shaped wood materials are laminated as the first laminated body, and two plate-shaped wood materials are laminated as the second laminated body.

The linear laminated block materials 35, 36, 37, and 38 are acquired by bonding, surface-to-surface, the plate-shaped wood materials having different lengths in the width direction. Note in the multi-layered inflammable wood material A that three plate-shaped wood materials are laminated.

In each laminated block material, the plate-shaped wood materials having different lengths in the width direction are used. Thus, the end part of each laminated block material can be easily stepped.

Also, by making the center plate-shaped wood material protrude, a convex part can be formed at an end part of the laminated block material. Conversely, by making the front and back plate-shaped wood materials protrude, a concave part can be formed at an end part of the laminated block material.

Figure 3:
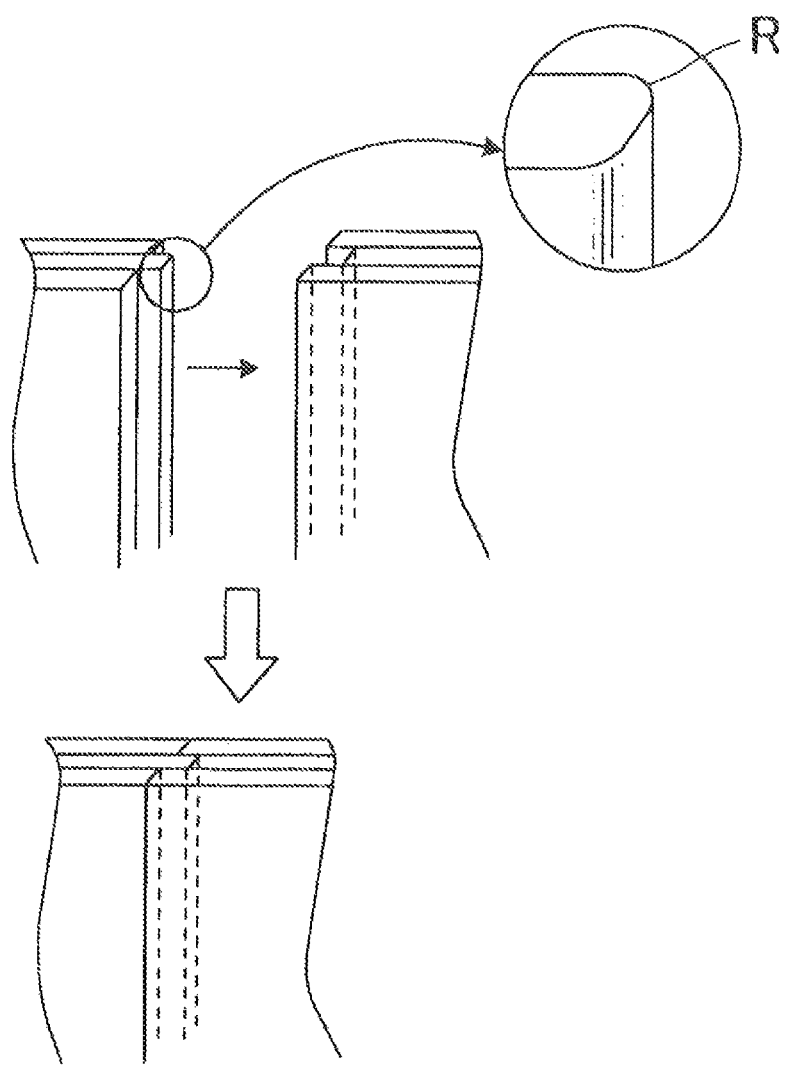
FIG. 3 is a perspective view schematically depicting a state in which a convex part of one laminated block material fits in a concave part of another laminated block material in the multi-layered inflammable wood material according to the first embodiment.

FIG. 3 is a perspective view schematically depicting a state in which a convex part of one laminated block material fits in a concave part of another laminated block material in the multi-layered inflammable wood material according to the first embodiment.

As depicted in FIG. 3, in the inner inflammable wood material part 2a and the outer inflammable wood material part 2b, the convex part extending in the vertical direction formed by making the center plate-shaped wood material of one laminated block material protrude is strongly press-fitted into the concave part extending in the vertical direction formed by making the front and back plate-shaped wood materials of another laminated block material protrude, thereby coupling the laminated block materials together.

Here, in the plate-shaped wood material forming the convex part, for ease of fitting into the concave part, roundness R is preferably provided to each of corner parts on both sides of the convex part. Note that such roundness R is provided in advance to the plate-shaped wood material where the convex part is to be formed when the laminated block material is fabricated. Also, here, as described above, the use of a bonding agent allows firm coupling, and no use of a bonding agent allows attachability and detachability.

Second Embodiment

Next, a second embodiment of the multi-layered inflammable wood material according to the present invention is described.

A multi-layered inflammable wood material B according to the second embodiment is an example having an outer appearance in the shape of a quadrangular prism and, as with the multi-layered inflammable wood material A according to the first embodiment described above, when used as a pillar.

Figure 4:
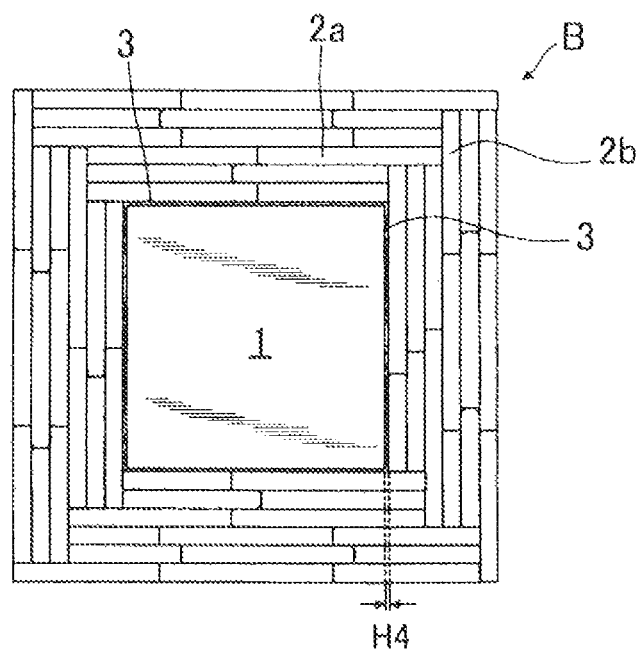
FIG. 4 is a horizontal sectional view depicting a second embodiment in which the multi-layered inflammable wood material according to the present invention is used as a pillar.

FIG. 4 is a horizontal sectional view depicting the second embodiment in which the multi-layered reinforced wood material according to the present invention is used as a pillar.

As depicted in FIG. 4, the multi-layered reinforced wood material B includes the support wood material part 1, which is a wood material for supporting load, the sheet part 3 attached to the periphery of the support wood material part 1, and an inner inflammable wood material part 2a attached outside the sheet part 3 and an outer inflammable wood material part 2b attached to the periphery of the inner inflammable wood material part 2a so as not to expose the sheet part 3.

That is, the multi-layered inflammable wood material B according to the second embodiment is identical to the multi-layered inflammable wood material A according to the first embodiment except that the sheet part 3 is further provided between the support wood material part 1 and the inner inflammable wood material part 2a.

The sheet part 3 is attached between the support wood material part 1 and the inner inflammable wood material part 2a, that is, to each side surface of the support wood material part 1. This extremely improves strength of the multi-layered inflammable wood material B.

The sheet part 3 has a flat sheet shape, and is attached to each side surface of the support wood material part 1 by being laminated thereto.

Here, the sheet part 3 preferably has a thickness H4 of 0.1 mm to 5 mm. If the thickness H4 is smaller than 0.1 mm, the strength improving effect may not be sufficiently acquired, compared with a case in which the thickness H4 is within the above-described range. If the thickness H4 exceeds 5 mm, compared with the case in which the thickness H4 is within the above-described range, weight increases, posing a drawback of deterioration of handling.

In the multi-layered inflammable wood material B, the sheet part 3 has a long shape, and thus is laminated to each side surface of the support wood material part 1 along the longitudinal direction (vertical direction) of the support wood material part 1. This allows an improvement in strength of the multi-layered inflammable wood material B in the longitudinal direction.

Here, the occupation ratio of the sheet part 3 on each side surface of the support wood material part 1 is preferably equal to or larger than 80% and, more preferably, equal to or larger than 90%. This allows a sufficient improvement in strength to be recognized. Note that the occupation ratio is a value acquired by dividing the area of the surfaces of all sheet parts 3 laminated to the side surfaces of the support wood material part 1 by the area of the side surfaces of the support wood material part 1.

The sheet part 3 is made of a fiber reinforced plastic. That is, the fiber reinforced plastic is excellent in strength and does not have stretching properties, and thus can suppress breaking and bending of the multi-layered inflammable wood material A by an earthquake or the like.

Specifically, it is possible to list those made of a fiber such as glass fiber, carbon fiber, or resin fiber such as Kevlar, lignin, and Dyneema, and unsaturated polyester, epoxy resin, polyamide resin, phenol resin, or the like.

Among these, as the sheet part 3, a carbon fiber reinforced plastic (CFRP) is suitably used.

Third Embodiment

Next, a third embodiment of the multi-layered inflammable wood material according to the present invention is described.

A multi-layered inflammable wood material C according to the third embodiment is an example having an outer appearance in the shape of a quadrangular prism and when used as a beam.

Figure 5:
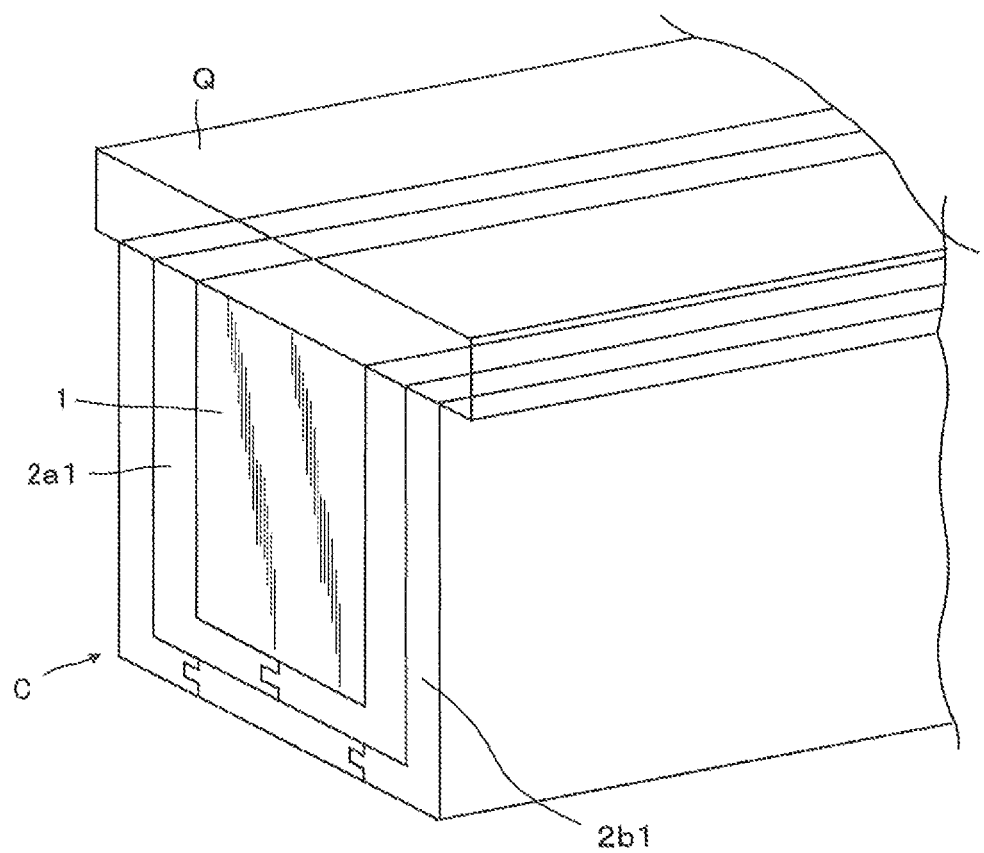
FIG. 5 is a partially transparent perspective view depicting a third embodiment in which the multi-layered inflammable wood material according to the present invention is used as a beam.

FIG. 5 is a partially transparent perspective view depicting the third embodiment in which the multi-layered inflammable wood material according to the present invention is used as a beam. Note in FIG. 5 that only the outline of the laminated block material is depicted.

As depicted in FIG. 5, the multi-layered inflammable wood material C includes the support wood material part 1, which is a wood material for supporting load, an inner inflammable wood material part 2a1 attached to the side surfaces and the lower surface of the periphery of the support wood material part 1, and an outer inflammable wood material part 2b1 attached outside the inner inflammable wood material part 2a1. That is, in the multi-layered inflammable wood material C, the side surfaces and the lower surface of the support wood material part 1 are covered with the inner inflammable wood material part 2a1 and the outer inflammable wood material part 2b1.

Note that while the inner inflammable wood material part 2a1 and the outer inflammable wood material part 2b1 are not provided to the upper surface and the end faces (surfaces parallel to a cross section) of the multi-layered inflammable wood material C, the upper surface is bonded to another building material such as a floor (slab) Q and the left and right side surfaces are each bonded to a beam (small beam), a pillar, or another building material when the multi-layered inflammable wood material C is used as a beam and, therefore, as a result, the upper surface and the end faces on both sides of the multi-layered inflammable wood material C are not exposed.

In the multi-layered inflammable wood material C, the inner inflammable wood material part 2a1 and the outer inflammable wood material part 2b1 are provided to the side surfaces and the lower surface of the support wood material part 1. Thus, it is possible to prevent the multi-layered inflammable wood material C itself from burning even if a fire occurs nearby. This does not cause a situation in which a fire is transferred from the multi-layered inflammable wood material C to another object.

In the multi-layered inflammable wood material C, since the support wood material part 1 is protected by the inner inflammable wood material part 2a1 and the outer inflammable wood material part 2b1, heat transfer to the support wood material part 1 can be suppressed even if the multi-layered inflammable wood material C is heated.

Also, the support wood material part 1 neither catches fire nor receives other external influences, and can maintain its initial state.

From these, the multi-layered inflammable wood material C according to the third embodiment is excellent in fire resistance, and damages on the support wood material part 1 are extremely small even if a fire occurs nearby.

Also, with the center plate-shaped wood material protrude, the present invention is not limited to the above-described embodiments.

In the multi-layered inflammable wood materials A to C according to the first to third embodiments, the support wood material part 1 is a wood material in the shape of a quadrangular prism, but is not limited to this if it can support load. That is, the support wood material part 1 may have a shape of a polygonal prism such as a triangular prism, pentagonal prism, or hexagonal prism, or may have a circular cylindrical shape.

Also, while the inner inflammable wood material part 2a and the outer flammable wood material part 2b are each in the shape of a hollow quadrangular prism, this is not meant to be restrictive as long as arrangement is possible so that the periphery of the support wood material part 1 is not exposed.

In the multi-layered inflammable wood materials A to C according to the first to third embodiments, a solid material is adopted as the support wood material part 1. However, this may be formed of plywood, laminated veneer lumber (LVL), a butcher block, or the like.

In the multi-layered inflammable wood material B according to the second embodiment, the sheet part 3 (fiber reinforced plastic) is laminated to each side surface of the support wood material part 1 along the longitudinal direction of the side surface. However, this is not meant to be restrictive.

For example, the sheet part 3 may be helically provided or may be provided in a ring shape to the support wood material part 1.

In the multi-layered inflammable wood material A according to the first embodiment, the number of laminated block materials to form the inner inflammable wood material part 2a or the outer inflammable wood material part 2b is not particularly restrictive.

Figure 6A:
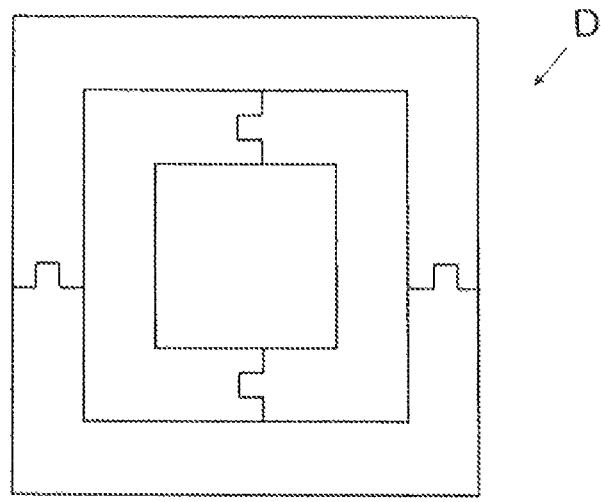
FIG. 6(a) to FIG. 6(c) are horizontal sectional views depicting examples with different numbers of laminated block materials configuring an inner inflammable wood material part and an outer inflammable material part in multi-layered inflammable wood materials according to other embodiments.
Figure 6B:
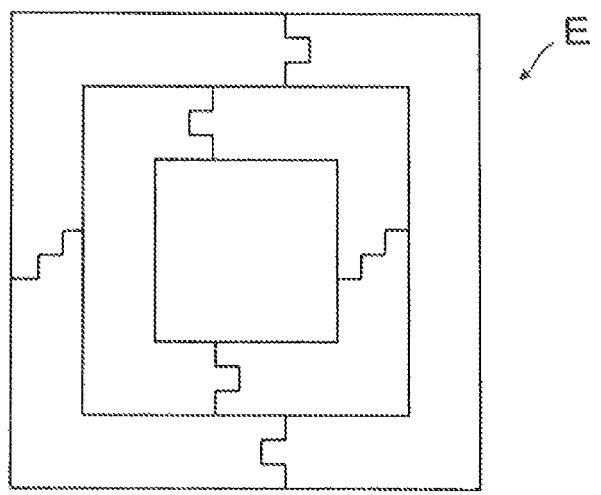
Figure 6C:
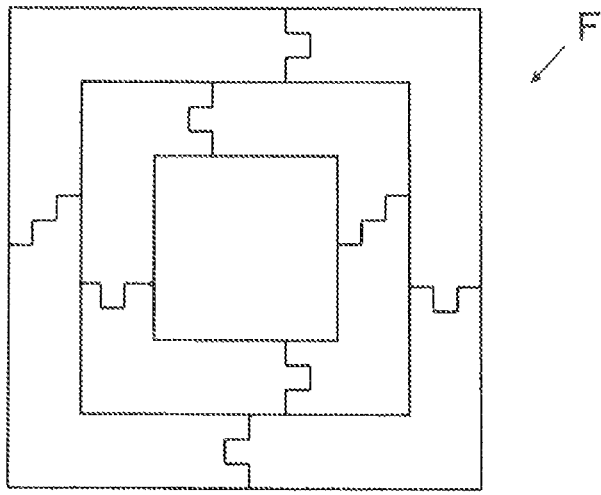

FIG. 6(a) to FIG. 6(c) are horizontal sectional views depicting examples with different numbers of laminated block materials configuring an inner inflammable wood material part and an outer inflammable material part in multi-layered inflammable wood materials according to other embodiments. Note in FIG. 6(a) to FIG. 6(c) that only the outline of each laminated block material is depicted.

A multi-layered inflammable wood material D depicted in FIG. 6(a) has an inner inflammable wood material part and an outer inflammable wood material part each formed of two laminated block materials, and a multi-layered inflammable wood material E depicted in FIG. 6(b) has an inner inflammable wood material part and outer inflammable wood material part each formed of three laminated block materials, and a multi-layered inflammable wood material F depicted in FIG. 6(c) has an inner inflammable wood material part and an outer inflammable wood material part each formed of four laminated block materials. In this manner, the number of laminated block materials into which the inner inflammable wood material part and the outer inflammable wood material part are each divided can be adjusted as appropriate.

Note that while these multi-layered inflammable wood materials D, E, and F have laminated block materials coupled, one piece of a solid material, laminated veneer lumber (LVL), plywood, or the like may be used in place of the laminated block materials.

In the multi-layered inflammable wood materials A and B according to the first and second embodiments, while the laminated block material is formed of a plurality of plate-shaped wood materials mutually laminated, the number of plate-shaped wood materials to be laminated is not particularly restrictive.

Also, here, while the plate-shaped wood materials having different lengths in the width direction are adopted, those having the same length in the width direction may be included, and those all having the same length in the width direction may be used.

In the multi-layered inflammable wood material A according to the first embodiment, while the concave part, the convex part, the stepped portion, or the like is provided to the side surface at the end part of each laminated block material for mutual coupling, they are not necessarily requisites.

FIG. 7(a) to FIG. 7(d) are horizontal sectional views depicting examples with different shapes of end parts of laminated block materials in multi-layered inflammable wood materials according to other embodiments. Note in FIG. 7(a) to FIG. 7(d) that only the outline of each laminated block material is depicted.

Figure 7A:
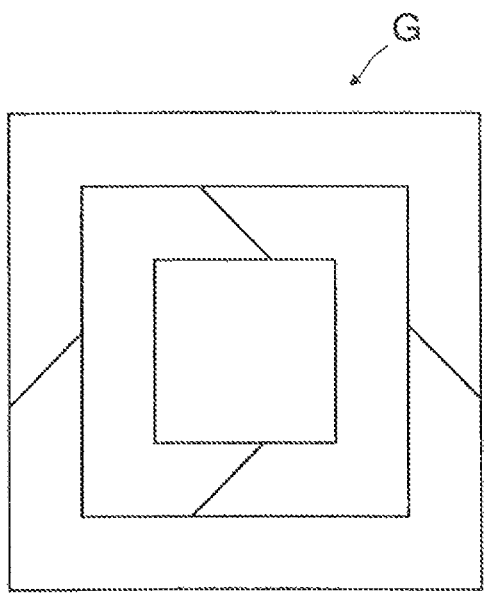
FIG. 7(a) to FIG. 7(d) are horizontal sectional views depicting examples with different shapes of end parts of laminated block materials in multi-layered inflammable wood materials according to other embodiments.
Figure 7C:
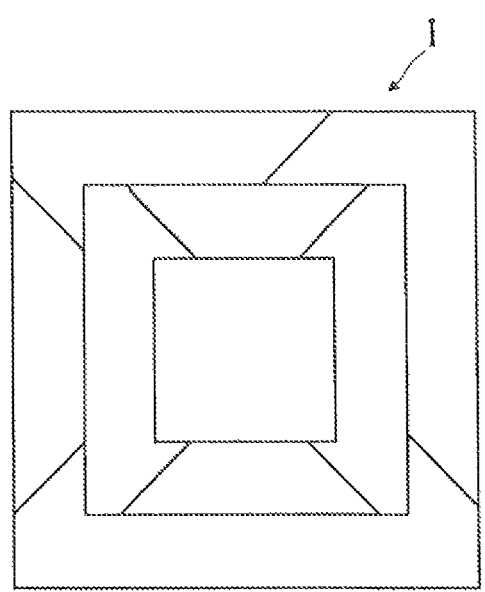
Figure 7B:
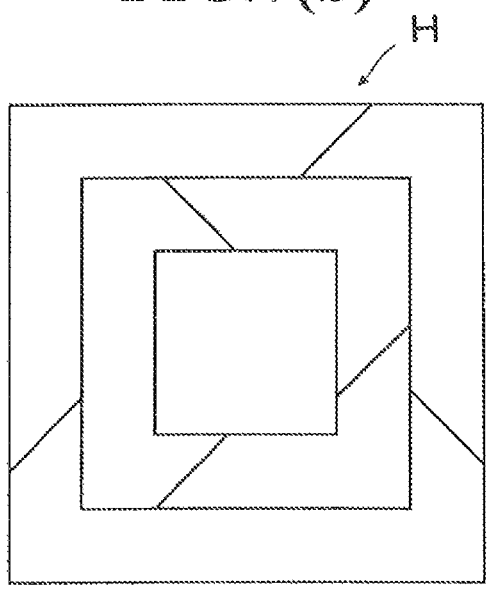
Figure 7D:
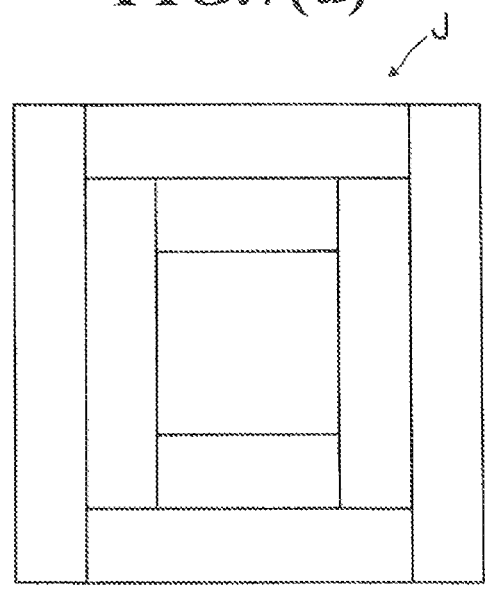

As depicted in FIG. 7(a) to FIG. 7(b), in multi-layered inflammable wood materials G, H, I, and J, by forming the side surface at the end part of each of the laminated block materials as a flat surface and mutually bonding these surfaces, the laminated block materials can be coupled to each other.

Note that while these multi-layered inflammable wood materials G, H, I, and J have laminated block materials coupled, one piece of a solid material, laminated veneer lumber (LVL), plywood, or the like may be used in place of the laminated block materials.

In the multi-layered inflammable wood materials A and B according to the first and second embodiments, the inner inflammable wood material part 2a and the outer inflammable wood material part 2b are each formed of the plurality of laminated block materials containing the inflammable agent. However, any of a solid material, laminated veneer lumber (LVL), plywood, or the like containing the inflammable agent can also be adopted.

In the multi-layered reinforced wood material according to the present invention, its outer surface may be subjected to so-called finishing process. For example, as an outer sheath, known coating may be applied, or a known sheet, sliced veneer, or decorative board may be laminated. In this case, precipitation of the inflammable agent can be suppressed, and durability of the multi-layered reinforced wood material is also improved.

EXAMPLES

In the following, while the present invention is more specifically described based on examples and comparative examples, the present invention is not limited to the following examples.

To the laminated block material, boron-based inflammable agents having amounts depicted in Table 1 were added to make inflammable wood materials.

Then, on these inflammable wood materials, tests were conducted as to the heat transfer suppression effect and the burning prevention effect.

The acquired results are depicted in Table 1. Note in Table 1 that "A1" refers to one where the heat transfer suppression effect was excellent and the effects of the present invention can be acquired, "B1" refers to one where the heat transfer suppression effect was observed and the effects of the present invention can be acquired, and "C1" refers to one where the heat transfer suppression effect was not recognized and the effects of the present invention cannot be acquired.

Similarly, "A2" refers to one where the burning prevention effect was excellent and the effects of the present invention can be acquired, "B2" refers to one where the burning prevention effect was observed and the effects of the present invention can be acquired, and "C2" refers to one where the burning prevention effect was not recognized and the effects of the present invention cannot be acquired.

TABLE 1

CONTENT OF INFLAMMABLE AGENT
HEAT TRANSFER SUPPRESSION EFFECT
BURNING PREVENTION EFFECT

From the results in Table 1, it has been confirmed that the heat transfer suppression effect was observed in the inflammable wood material having a content of the inflammable agent equal to or larger than 50 kg/m$^3$ and smaller than 200 kg/m$^3$, which is thus suitable for the inner inflammable wood material part in the multi-layered inflammable wood material of the present invention.

Also, the burning prevention effect was observed in the inflammable wood material having a content of the inflammable agent equal to or larger than 200 kg/m$^3$, which is thus suitable for the outer inflammable wood material part in the multi-layered inflammable wood material of the present invention.

INDUSTRIAL APPLICABILITY

The multi-layered inflammable wood material according to the present invention is suitably used as a building material of a skeletal framework of an architecture, for example, a pillar or beam.

According to the multi-layered inflammable wood material of the present invention, fire resistance is excellent, damages on the support wood material part can be extremely decreased even if a fire occurs nearby.

REFERENCE SIGNS LIST

1 . . . support wood material part
21 . . . first inner laminated block material (laminated block material)
21a, 22a, 23a, 31a, 32a, 33a, 34a, 35a, 36a, 37a . . . convex part
21b, 22b, 24b, 31b, 32b, 34b, 35b, 36b, 37b, 38b . . . concave part
22 . . . second inner laminated block material (laminated block material)
23 . . . third inner laminated block material (laminated block material)
24 . . . fourth inner laminated block material (laminated block material)
2a, 2a1 . . . inner inflammable wood material part
2b, 2b1 . . . outer inflammable wood material part
3 . . . sheet part
31 . . . first outer laminated block material (laminated block material)
32 . . . second outer laminated block material (laminated block material)
33 . . . third outer laminated block material (laminated block material)
34 . . . fourth outer laminated block material (laminated block material)
35 . . . first auxiliary laminated block material (laminated block material)
36 . . . second auxiliary laminated block material (laminated block material)
37 . . . third auxiliary laminated block material (laminated block material)
38 . . . fourth auxiliary laminated block material (laminated block material)
A, B, C, D, E, F, G, H, I, J . . . multi-layered inflammable wood material
H1, H2, H3, H4 . . . thickness

The invention claimed is:

1. A multi-layered inflammable wood material for use as a building material, comprising:
a support wood material part for supporting load;
an inner inflammable wood material part attached to a periphery of the support wood material part so as to cover the support wood material part; and
an outer inflammable wood material part attached to a periphery of the inner inflammable wood material part so as to cover the inner flammable wood material part, wherein
the inner inflammable wood material part and the outer inflammable wood material part both contain therein an inflammable agent, and
a content of the inflammable agent in the inner inflammable wood material part is equal to or larger than 50 kg/m$^3$ and smaller than 200 kg/m$^3$, and
a content of the inflammable agent in the outer inflammable wood material part is equal to or larger than 200 kg/m$^3$.

2. The multi-layered inflammable wood material according to claim 1, wherein
the inner inflammable wood material part and the outer inflammable wood material part are both formed by mutually coupling a plurality of laminated block materials containing therein the inflammable agent.

3. The multi-layered inflammable wood material according to claim 2, wherein
the laminated block materials at its end part each have a convex part that has convex shape in horizontal cross section, and is extended in vertical direction or a concave part that has concave shape in horizontal cross section, and is extended in vertical direction, and
the convex part of one said laminated block material fits in the concave part of another said laminated block material.

4. The multi-layered inflammable wood material according to claim 2, wherein
the laminated block materials are each formed by mutually laminating a plurality of plate-shaped wood materials.

5. The multi-layered inflammable wood material according to claim 1, wherein
the inflammable agent is a boron-based inflammable agent.

6. The multi-layered inflammable wood material according to claim 1, wherein
a sheet part made of a carbon fiber reinforced plastic is further provided between the support wood material part and the inner inflammable wood material part.

7. The multi-layered inflammable wood material according to claim 6, wherein
the support wood material part has a shape of a polygonal prism,
the sheet part has a long shape, and
the sheet part is laminated to each side surface of the support wood material part along a longitudinal direction of the side surface.

8. The multi-layered inflammable wood material according to claim 1 for use as a pillar or beam.

9. The multi-layered inflammable wood material according to claim 3, wherein
the laminated block materials are each formed by mutually laminating a plurality of plate-shaped wood materials.

* * * * *